(12) United States Patent
Thompson et al.

(10) Patent No.: US 7,211,038 B2
(45) Date of Patent: May 1, 2007

(54) METHODS FOR MELTING OF MATERIALS TO BE TREATED

(75) Inventors: Leo E. Thompson, Kennewick, WA (US); Patrick S. Lowery, Kennewick, WA (US); Steven L. Woosley, Pasco, WA (US)

(73) Assignee: Geosafe Corporation, Richland, WA (US)

( * ) Notice: Subject to any disclaimer, the term of this patent is extended or adjusted under 35 U.S.C. 154(b) by 266 days.

(21) Appl. No.: 10/808,929

(22) Filed: Mar. 25, 2004

(65) Prior Publication Data

US 2004/0242951 A1    Dec. 2, 2004

Related U.S. Application Data

(63) Continuation-in-part of application No. PCT/US01/42321, filed on Sep. 25, 2001.

(51) Int. Cl.
*B09B 3/00* (2006.01)
(52) U.S. Cl. .................................................. 588/252
(58) Field of Classification Search ............... 588/11, 588/12, 252, 253
See application file for complete search history.

(56) References Cited

U.S. PATENT DOCUMENTS

| | | | |
|---|---|---|---|
| 1,069,255 A | | 8/1913 | Héroult |
| 2,531,612 A | | 11/1950 | Crochet et al. |
| 3,110,557 A | * | 11/1963 | Spector ..................... 588/15 |
| 3,137,347 A | | 6/1964 | Parker |
| 3,321,171 A | * | 5/1967 | Gorka et al. ................ 249/201 |
| 3,837,630 A | | 9/1974 | Kohl et al. |
| 3,970,488 A | | 7/1976 | Nelson |
| 4,017,674 A | | 4/1977 | Chapman |
| 4,376,598 A | | 3/1983 | Brouns et al. |
| 4,581,163 A | * | 4/1986 | Meininger et al. ............. 588/3 |
| 4,633,481 A | | 12/1986 | Schwenninger |
| 4,660,211 A | | 4/1987 | Stritzke |
| 4,759,879 A | | 7/1988 | Cadoff et al. |

(Continued)

FOREIGN PATENT DOCUMENTS

DE     195 43 430 A1    5/1997

(Continued)

OTHER PUBLICATIONS

Accession No. 1996-018838 [02] Database WPI.

(Continued)

*Primary Examiner*—John Kreck
(74) *Attorney, Agent, or Firm*—Klarquist Sparkman, LLP

(57) ABSTRACT

A process for melting material to be treated includes placing material to be treated in a container that may include an insulating lining, heating the material to be treated and melting the material to be treated, preferably allowing the melted material to cool to form a vitrified and/or crystalline mass, and disposing of the mass. The mass is either disposed while contained in container or removed from container after cooling and disposed. Insulating lining may comprise one or more layers of a thermal insulating material, one or more layers of refractory material, or a combination thereof. The material to be treated may be heated by placing at least two electrodes in the material to be treated and passing a current between the electrodes, or alternatively, by placing at least one heating element in the material to be treated and passing heat into the material to be treated.

9 Claims, 4 Drawing Sheets

U.S. PATENT DOCUMENTS

| | | | |
|---|---|---|---|
| 4,762,991 A | | 8/1988 | Timmerman et al. |
| 4,895,678 A | * | 1/1990 | Ohtsuka et al. ............... 588/18 |
| 4,900,196 A | | 2/1990 | Bridges |
| 4,956,535 A | | 9/1990 | Buelt et al. |
| 4,957,393 A | | 9/1990 | Buelt et al. |
| 5,004,373 A | | 4/1991 | Carter |
| 5,024,556 A | | 6/1991 | Timmerman |
| 5,032,161 A | | 7/1991 | Pieper et al. |
| 5,062,118 A | | 10/1991 | Masaki |
| 5,100,259 A | | 3/1992 | Buelt et al. |
| 5,114,277 A | | 5/1992 | Murphy et al. |
| 5,292,375 A | | 3/1994 | Kumar et al. |
| 5,316,411 A | | 5/1994 | Buelt et al. |
| 5,319,669 A | | 6/1994 | Cox et al. |
| 5,341,128 A | | 8/1994 | Keyser et al. |
| 5,435,942 A | | 7/1995 | Hsu |
| 5,443,618 A | * | 8/1995 | Chapman ..................... 75/414 |
| 5,536,114 A | | 7/1996 | Wetmore et al. |
| 5,626,249 A | | 5/1997 | Tylko |
| 5,643,350 A | | 7/1997 | Mason et al. |
| 5,662,579 A | | 9/1997 | Bickford |
| 5,673,285 A | | 9/1997 | Wittle et al. |
| 5,678,237 A | * | 10/1997 | Powell et al. ................. 588/11 |
| 5,743,937 A | * | 4/1998 | Chapman ..................... 75/414 |
| 5,798,497 A | | 8/1998 | Titus et al. |
| 5,888,292 A | | 3/1999 | Tremblay |
| 5,910,093 A | | 6/1999 | Sliger |
| 5,926,498 A | | 7/1999 | Mechtersheimer |
| 6,120,430 A | * | 9/2000 | Hansen et al. .............. 588/253 |
| 6,355,904 B1 | * | 3/2002 | Batdorf et al. ......... 219/121.59 |
| 2002/0169352 A1 | | 11/2002 | Albus et al. |
| 2003/0203803 A1 | | 10/2003 | Jantzen et al. |
| 2004/0242951 A1 | | 12/2004 | Thompson et al. |

FOREIGN PATENT DOCUMENTS

| | | |
|---|---|---|
| EP | 0 034 109 A1 | 8/1981 |
| EP | 0 445 030 A2 | 9/1991 |
| EP | 0 445 030 A3 | 9/1991 |
| EP | 1 147 827 A1 | 10/2001 |
| EP | 1 009 550 B1 | 8/2004 |
| FR | 2 865 798 A1 | 8/2005 |
| GB | 803457 | 10/1958 |
| JP | 07 042924 | 2/1995 |
| JP | 3344999 | 11/2002 |
| JP | 3345000 | 11/2002 |
| JP | 3403722 | 5/2003 |
| JP | 3450323 | 9/2003 |
| WO | 93/15278 | 8/1993 |
| WO | WO 03/026745 A1 * | 4/2003 |
| WO | WO 03/038361 | 5/2003 |

OTHER PUBLICATIONS

International Search Report for PCT/US01/42321, filed Sep. 25, 2001.

International Search Report and Written Opinion for PCT/US2006/002968, filed Jan. 27, 2006.

International Search Report and Written Opinion for PCT/US2006/002969, filed Jan. 27, 2006.

International Search Report and Written Opinion for PCT/US2006/002970, filed Jan. 27, 2006.

International Search Report and Written Opinion for PCT/US2006/002971, filed Jan. 27, 2006.

International Search Report and Written Opinion for PCT/US2006/002972, filed Jan. 27, 2006.

Buelt, J.L. et al., "In Situ Vitrification of Transuranic Waste: An Updated System Evaluation and Applications Assessment," Battelle Pacific Northwest Laboratory, pp. vi, 39, 104 (Mar. 1987).

* cited by examiner

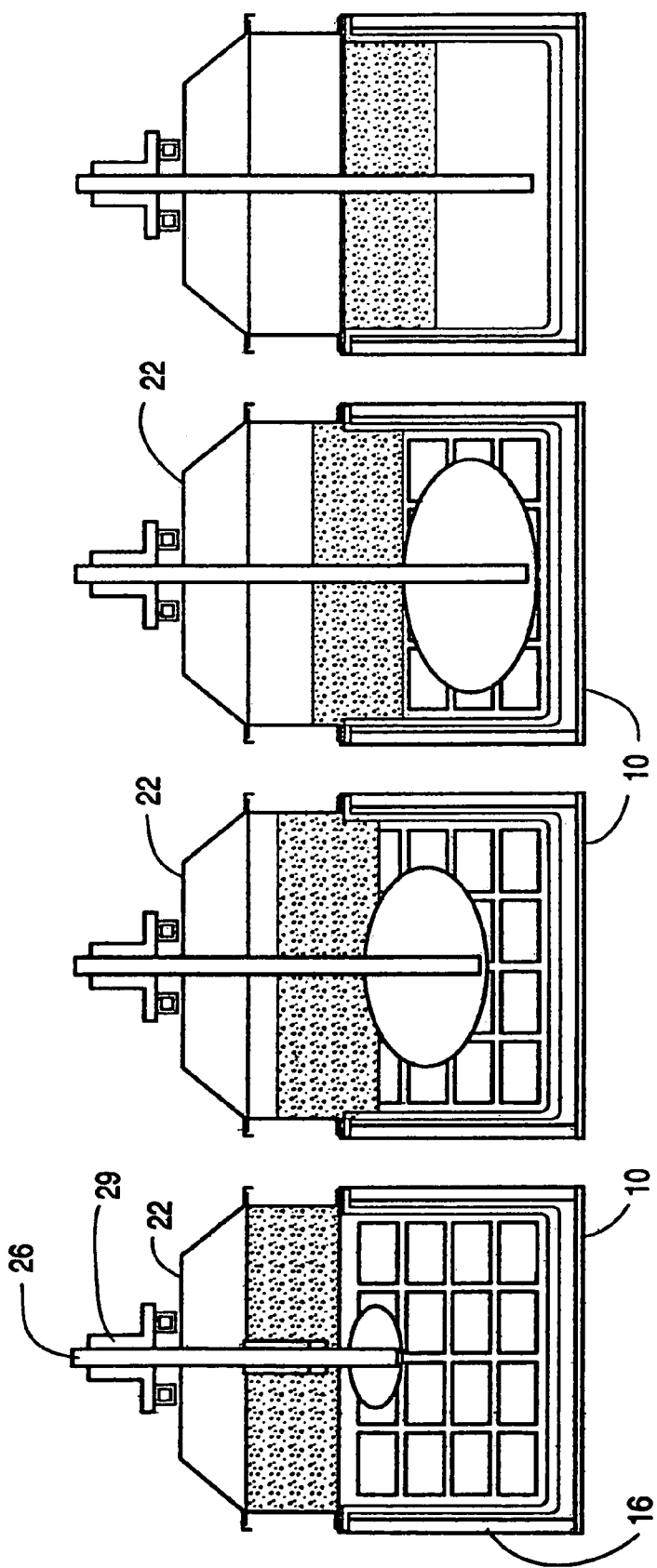

METHODS FOR MELTING OF MATERIALS TO BE TREATED

This application is a continuation-in-part application of International Application Number PCT/US01/42321, filed on Sep. 25, 2001.

BACKGROUND OF THE INVENTION

1. Field of the Invention

The present invention relates to a method and apparatus for the melting of materials to be treated. More specifically, the invention relates to an apparatus that comprises a container in which melting is performed, thus enabling a one-step disposal method for the treated materials.

2. Description of the Prior Art

The use of vitrification methods for safely disposing contaminated soil or waste materials (hereinafter referred to as material to be treated) is known in the art. Examples of such methods are provided in U.S. Pat. Nos. 4,376,598; 5,024,556; 5,536,114; 5,443,618; and, U.S. RE Pat. No. 35,782. The disclosures of these patents are incorporated herein by reference.

Generally, the known vitrification methods involve placement of the material to be treated into a vitrification chamber or vessel. Electrodes are then introduced into the material and a high current is supplied there between. Application of the current is continued until the temperature of the material is raised to the point where the material begins to melt and is continued until the material is completely melted. If certain cases, other additives may be required to provide an initial electrically conductive resistance path through the material to be treated if such material is not capable of adequate current conduction. Once the resistance path is initiated and melting of the material begins, the molten material itself will continue current conduction.

In the course of melting the material, organic components are destroyed or vaporized and the gases are normally vented through a suitable scrubber, quencher, filter or other known device or method.

Once the material is sufficiently melted and all organic components are treated, the electricity supply is terminated and the molten material allowed to cool. The cooling step then results in a vitrified and/or crystallized solid material. In this manner, inorganic contaminants are immobilized within a solid, vitrified mass thereby ensuring containment of the contaminants and facilitating disposal of same.

In the known methods, vitrification is accomplished within a complex refractory-lined melting apparatus or within a pit dug into the soil. In U.S. Pat. No. 5,443,618, an example is provided of a vitrification apparatus comprising a chamber that is either permanently in place (as in a treatment facility) or one which can be dismantled and reassembled at desired locations. In each case, the molten mass is removed from the chamber and processed further separately. Such further processing may involve burial, or other type of disposal, of the vitrified and/or crystalline mass. The apparatus known in the art for conducting vitrification process are normally complex structures including various electrical supply systems, waste feed systems, molten glass discharge systems, cooling systems and venting systems. Such systems require the removal of the melted mass while in the molten state, hence requiring the above mentioned molten glass discharge systems. In these cases, the melt is either poured or flowed out as a molten liquid into a receiving container.

In U.S. Pat. No. 4,376,598 and U.S. RE Pat. No. 35,782, vitrification processes within a pit are described. In this case, the material to be treated is dumped into a pit or trench in the ground and a soil or other type of cap is placed as a cover. Electrodes are then introduced to conduct the vitrification process as described above. Once the process is completed, the vitrified and/or crystalline mass is left buried in the ground. As will be appreciated, certain contaminants such as radioactive waste etc. cannot safely be disposed in this manner as they must be disposed of in regulated burial locations.

Generally, the known methods are expensive and are used in difficult situations to which there is no alternative. Therefore, there exists a need for a vitrification apparatus and method that overcomes various deficiencies in the prior art.

SUMMARY OF THE INVENTION

In one embodiment, the present invention provides a process for melting materials to be treated, the process generally comprising the following exemplary steps:

placing the material to be treated into a container;

heating the material to be treated in the container until it melts to create melted material; and allowing the melted material to cool in the container to create a solidified material.

The material to be treated can be (a) contaminated soil, such as soil containing radioactive or non-radioactive material, (b) hazardous material of any type, or (c) any waste. The material to be treated is preferably heated by at least one heating element or at least two electrodes, depending on the method of heating, positioned in the material to be treated and passing a current between the electrodes (or passing heat from the heating element), and hence through the material to be treated. The current and/or heating element heats the material to be treated and causes it to melt sufficiently for the melted material to form a solidified vitreous and/or crystalline mass after it is allowed to cool. The solidified material may be disposed while it is within the container (i.e., the material and container are both disposed) or may be disposed after it cools by removing it from the container and disposing of it.

In another embodiment, the present invention provides a container for treating material comprising a box, said box including an inner lining comprising one or more layers of a thermal insulating material, one or more layers of a refractory material, or a combination thereof.

BRIEF DESCRIPTION OF THE DRAWINGS

These and other features of the preferred embodiments of the invention will become more apparent in the following detailed description in which reference is made to the appended drawings wherein:

FIGS. 4a to 4d are end cross sectional elevation views of the apparatus of FIG. 3 in various stages of the melting process of the invention.

DESCRIPTION OF THE PREFERRED EMBODIMENTS

Figure 1:
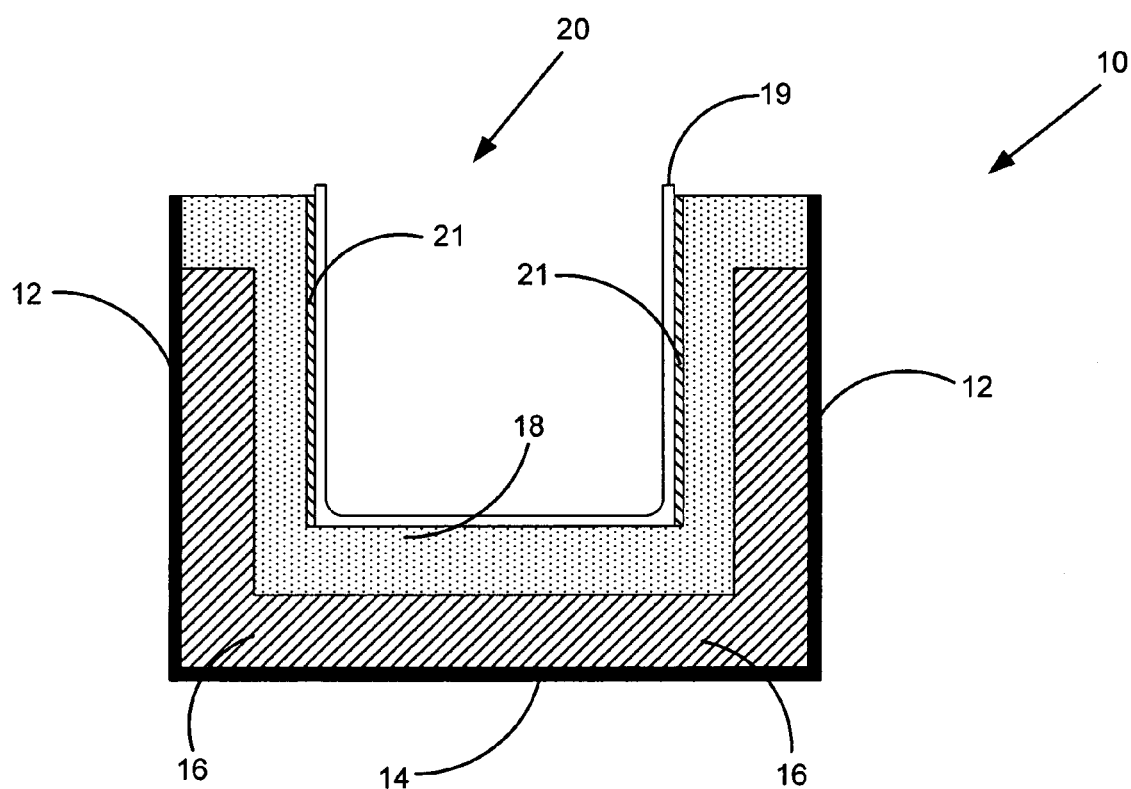
FIG. 1 is an end cross sectional elevation view of a container according to an embodiment of the present invention.

As discussed above, traditional vitrification processes have been conducted in pits or in complex chambers. The present invention, however, provides a container into which the material to be treated is placed and in which the melting process is conducted. Moreover, the container is manufactured in such as a manner as to be low in cost and easily disposable once the melting process is completed. This avoids the need to remove and handle the vitrified and/or crystalline mass, thereby providing a safe and easy means of waste disposal.

The container of the present invention may be used in virtually all types of melting processes. The container of the present invention may be used with virtually any material that can be melted or treated by molten materials. For example, the container and process may be used for various contaminant types such as heavy metals, radionuclides, and organic and inorganic compounds. Concentrations of the contaminants can be of any range. Further, the invention can be used with any material capable of being melted, such as silica or soil types such as, for example, sands, silts, clays, etc. The material types may be wet or comprise sludges, sediments, or ash.

As indicated above, the general melting process involves electric melting of materials to be treated, such as contaminated soil or other earthen materials for purposes of destroying organic contaminants and immobilizing hazardous inorganic and radioactive materials within a high-integrity, vitrified and/or crystalline product. Electric melting may occur using different types of heating processes such as joule-heating and plasma-heating. The process is initiated by placing at least two electrodes, or at least one heating element, within the material to be treated, followed, optionally, by placement of a conductive starter path material between the at least two electrodes. When electrical power is applied, current flows through the starter path, heating it up to the point that it melts the soil and waste adjacent to it. When the adjacent soil and waste becomes molten, they become electrically conductive, and from that point on, the molten material serves as the heating element for the process. Heat is conducted from the molten mass into adjacent un-melted materials, heating it also to the melting point, at which time it becomes part of the conductive heating element. The process continues by increasing the amount of material melted until the supply of electric power is terminated. During the melting process, any off gases are captured and, where necessary, treated in a suitable, known manner. The solidified mass resembles a vitrified and/or crystalline product and immobilizes non-gassified contaminants such as heavy metals and radionuclides etc. The melting process has a high tolerance for debris such as steel, wood, concrete, boulders, plastic, bitumen, tires etc.

For typical naturally occuring soil materials, the melting process may be performed in the temperature range of about 1400° to 2000° C., depending primarily on the composition of the materials being melted. Melts of various sizes and shapes can be produced. It should also be understood that there is no set range of temperatures under which the melting process of the present invention may be performed. Instead, the temperature range may be raised or lowered depending on the additives used in connection with the present invention. The higher the temperature, the more costly the melting process.

During the melting process, volume reduction generally occurs due to the melting of the materials to be treated. Thus, in an optional embodiment, additional material may be added to the container, using active or passive feeding methods, thereby maximizing the amount of material treated in the container. Passive feeding occurs when additional material to be treated is stored on top of the container prior to the start of the melting process. During the melting process, the melting of the material to be treated results in the lowering of the additional material to be treated into the container, and subsequently, the treatment of the additional material to be treated. During active feeding, additional material to be treated is added to the container during the melting process.

In a preferred embodiment of the present invention, the melting process involves the use of a steel container such as a commercial "roll-off box", which is commonly available. In accordance with the present invention, the container is insulated to inhibit transmission of heat, and is also provided with a refractory lining inside the box to protect the box during the melting step. The refractory lining and insulating material may be comprised of the same or different materials. The refractory lining may be comprised of pre-fabricated materials or naturally occurring refractory materials such as bricks, sand, or concrete, a mixture thereof, a thermal insulation board, or any other material having a high melting point. The at least two electrodes or at least one heating element is placed within the box. The material to be treated is then placed within the box and the melting process is conducted as described above. Once melting is complete, the contents of the box are allowed to cool and solidify. Subsequently, the box is then disposed of along with the vitrified and/or crystallined contents. In an alternate embodiment, the vitrified and/or crystallined contents can be removed from the box and disposed of separately, thereby allowing the box to be re-used.

FIG. 1 illustrates a treatment container according to one embodiment of the present invention. As illustrated, the container 10 comprises a box having sidewalls 12 and a base 14. The container 10 is provided with a layer of insulation 16 on each of the sidewalls 12 and the base 14. Insulation 16 may be comprised of materials such as bricks, sand, or concrete, a mixture thereof, a thermal insulation board, or any other material having a high melting point. After placement of the insulation, the container is lined with a refractory material 18. The refractory material is provided so as to line the sides as well as base of the container. In this manner, a space 20 is left into which the material to be treated can be placed. In a preferred embodiment, when free liquids are used in connection with the invention, the refractory material may be further lined with a liquid impermeable liner 19, such as a plastic liner 19.

Figure 2:
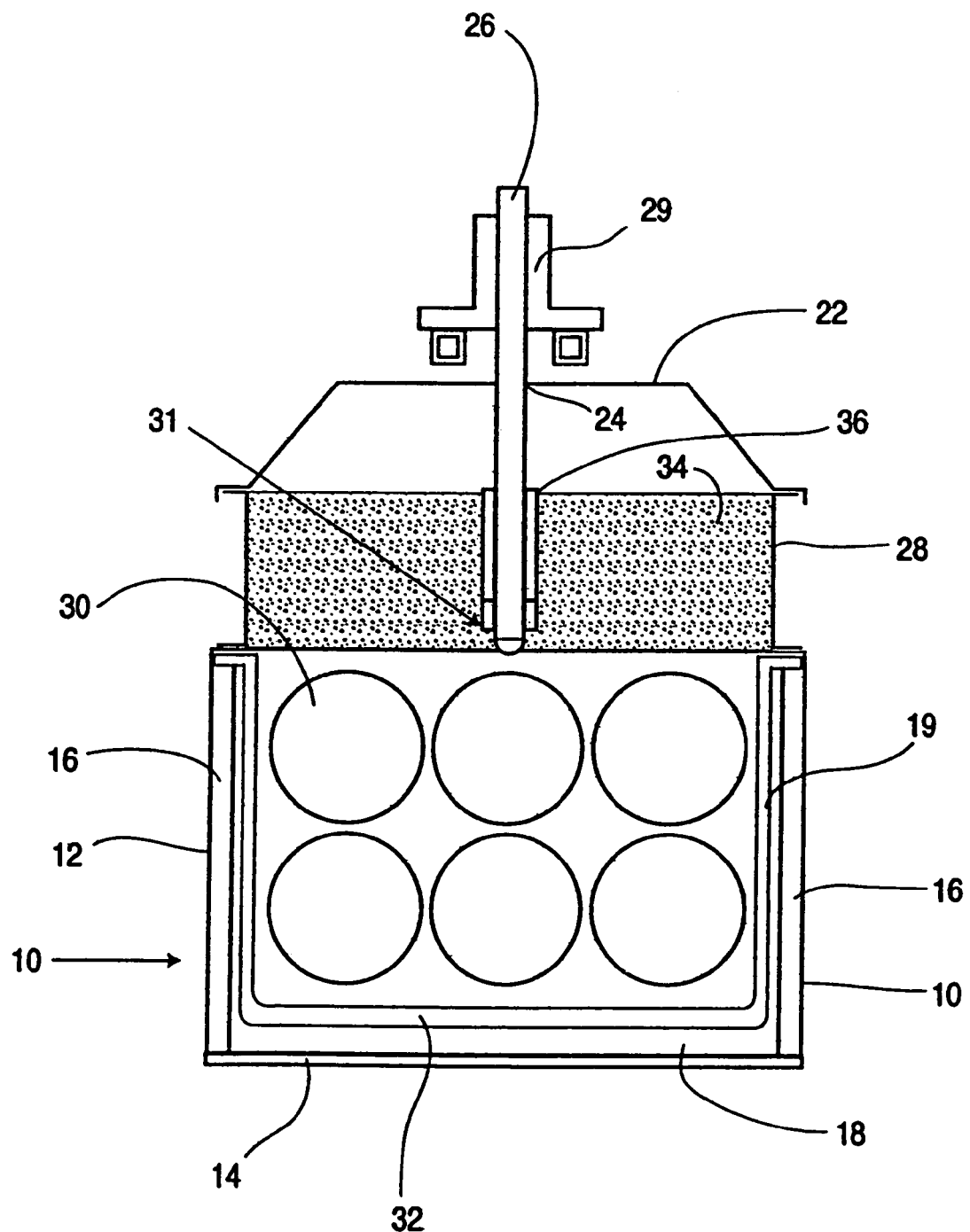
FIG. 2 is an end cross sectional elevation view of an apparatus including the container of FIG. 1 when in use according to an embodiment of the invention.

FIG. 2 illustrates one embodiment of the present invention. As shown, the container of FIG. 1 is provided with a lid or cover 22. The lid or cover 22 is positioned over the container 10 and seals the top thereof. The lid or cover is provided with openings 24 through which extend the at least two electrodes or the at least one heating element 26.

Between the lid or cover 22 and the container 10, may be placed a connector 28, which connects the lid or cover 22 to the container 10.

As indicated in the example shown in FIG. 2, after the insulation 16 and refractory material 18 are placed in the container 10, the material to be treated 30 is then placed within the space 20. For example, if drums are used in connection with the present invention, the drums may comprise standard 55 or 30 gallon drums. It should be understood, however, that there is no limitation on the size of the drum or container used with the present invention. Void spaces between the drums 30 are filled with soil 32. Such soil, 32, is also provided to cover the drums. Further, a layer of cover soil 34 is placed over the covered drums and extends into the connector 28. An electrode or heating element placement tube 36 extends through the cover soil 34. The at least two electrodes or at least one heating element 24 for the treatment process extend through the placement tube 36.

Figure 3:
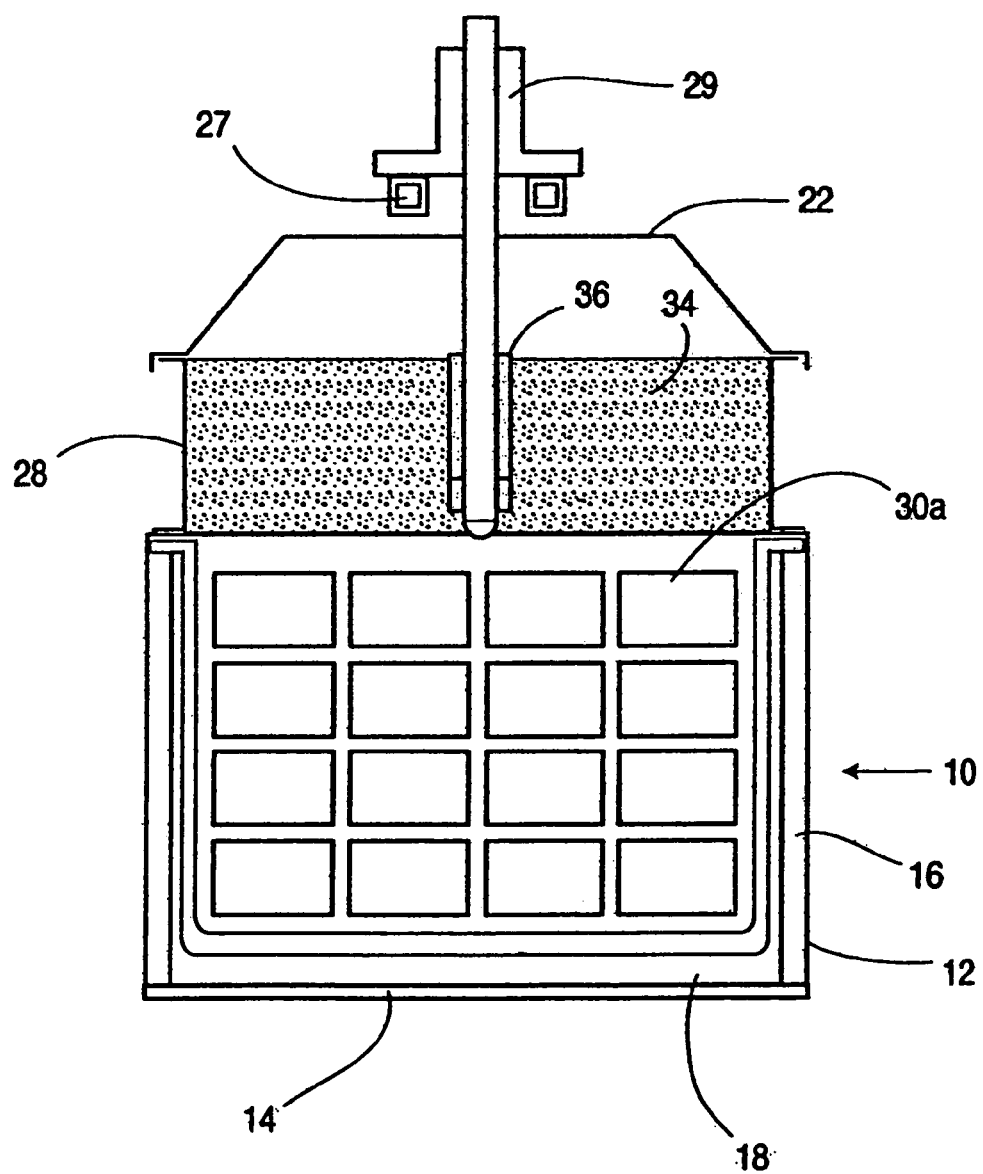
FIG. 3 is an end cross sectional elevation view of an apparatus including the container of FIG. 1 when in use according to another embodiment of the invention.

FIG. 3 illustrates another exemplary embodiment of the invention wherein compacted drums 30a or any other materials to be treated are provided in the container 10 instead of cylindrical drums as shown in FIG. 2.

The present invention will now be described in terms of the steps followed. First, the containers are, as described above, lined with a thermal insulation board, followed by placement of a slip form to facilitate the installation of a layer of refractory material. A liquid impermeable liner is then placed in the container so that materials to be treated and soil can be staged within the liquid impermeable liner. The liquid impermeable liner may be used to contain liquids prior to treatment when the material to be treated contains appreciable liquids. The slip form may be removed once the material to be treated is emplaced.

As described below in the example, the material to be treated can be placed within the container in drums. Within the drums, the material to be treated can be compacted to maximize the amount of the material to be treated. Alternatively, in another embodiment, the material to be treated can be placed directly into the container without the need for drums. In another embodiment, the material to be treated can be placed within the container in bags or boxes. In still another embodiment, liquid wastes can be mixed with soil or other absorbents and placed in the container.

As will be understood by persons skilled in the art, various additives may be added to the material to be treated to improve or enhance the process of the invention. For example, such additives may increase the conductivity of the material to be treated (e.g. $Na^+$) or aid in oxidizing metals contained in the material to be treated (e.g., sucrose or $KMnO_4$). Other additives may be used, such as additives to improve the durability of the vitrified and/or crystalline mass (i.e. the solidified material) or chemicals added to enhance the destruction of chlorinated organics such as PCBs. Additionally, additives may affect melt temperature by raising or lowering the melt temperature.

In one embodiment, the containers of the present invention can be standard "roll-off" boxes ranging in volume from 10 to 40 cubic yards. Such containers or boxes may have any variety of dimensions of length, width and height. As will be appreciated by persons skilled in the art, the dimensions of the box will be limited only by the requirements of any apparatus that must be attached thereto. In another embodiment, the container of the invention may comprise metal drums, such as standard 55 gallon steel drums. Such drums can be provided with the required insulation and/or refractory material layers as discussed herein. The wall thickness of the containers of the invention can also vary. Typically, standard boxes have wall thicknesses that are in the range of 10 to 12 gauge; however, as will be apparent to persons skilled in the art, other dimensions are possible.

In general terms, the pre-fabricated insulation and refractory materials form a liner or liner system in the interior of the container. Such liner serves to maintain heat within the container so as to increase the efficiency of the melting process. With this in mind, it will be appreciated that the refractory material can also serve as an insulating layer. In such case, the thickness of the refractory material in the container may be increased to provide the needed insulating value. Alternatively, the refractory material may be omitted and only an insulating layer provided in the container. In the case where both a refractory layer and separate insulating layer are used, the refractory material would also serve to slow down the transfer of heat to the insulating layer. In such case, it would be possible to extract the insulating layers from the container after the melting process and re-use them. In another embodiment, multiple layers of insulating and/or refractory liners may be used. As will be understood, the amount of insulating and/or refractory material would depend, amongst other criteria, on the nature of the soil and materials being treated. For example, if such soil and material to be treated has a high melting temperature, then extra insulating and/or refractory material would be required.

EXAMPLE

The invention will now be described with reference to a specific example wherein radioactive substances, such as uranium chips in the presence of oil, are involved. It will be understood that the example is not intended to limit the scope of the invention in any way.

First, the material to be treated is placed within 30 gallon drums. The drums, containing the material to be treated, are then compressed or compacted and placed within 50 gallon drums and packed with soil and sealed. These latter drums are then introduced into the treatment container 10. During the compression of the smaller drums, any oil in the material to be treated may need to be removed and treated separately, as described farther below.

The placement of the compacted drums of material to be treated (e.g. uranium and oil) into the container 10 can be performed in two ways. The first method involves emptying of the 55-gal drums holding the compacted smaller drums and soil into the container 10. The compacted drums would be immediately covered with soil to prevent free exposure to air. In this method, the compacted drums may be staged more closely together for processing, and a higher loading of uranium can be achieved. In addition, by removing the compacted drums from the 55-gal drums, there would be no requirement to ensure that the 55-gal drums were violated or otherwise unsealed so as to release vapours during the melting phase.

Alternatively, the 55-gal drums containing the compacted drums could be placed directly into the waste treatment containers for treatment. In this case, vent holes will be installed into the drums to facilitate the release of vapours during processing.

Some of the contaminated oil removed during the compression phase of the smaller (30 gallon) drums can be added to the soil in the treatment volume in the container for processing with the drums of uranium. The liquid impermeable liner 19 will prevent the movement of free oil from the materials to be treated into the refractory sand materials 18. The slip form 21 will be raised as the level of waste, soil, and refractory sand are simultaneously raised, until the container is filled to the desired level. At that point the slip form 21 will be removed to a storage location.

A layer of clean soil is placed above the staged waste and refractory sand. Electrodes are then installed into the soil layer. The installation of the electrodes may involve the use of pre-placed tubes to secure a void space for later placement of electrodes 26. Alternatively, the pair of electrodes are installed in the staged waste and refractory sand prior to the layer of clean soil being placed above the staged waste and refractory sand. A starter path is then placed in the soil between the electrodes. Lastly, additional clean cover soil 34 is placed above the starter path 31. This will conclude the staging of the waste within the treatment container. The configuration of the waste treatment containers after waste staging is shown in FIGS. 2 and 3.

Once the waste treatment container 10 is staged with waste as described above, it is covered with an off-gas collection hood 22 that is connected to an off-gas treatment system. Electrode feeder support frames 27, to support electrode feeders 29, are then positioned over the container-hood assembly 22 unless they are an integral part of the hood 22 design, in such case they will already be in position. At least two electrodes 26 are then placed through the feeder 29, into the hood 22 and into the tube 36 placed at the end of the starter path 31. Additional starter path material will be placed within the tube 36 to ensure a good connection with the starter path 31. Finally the remainder of the tube will be filled with clean cover soil 34. This will complete the preparation of materials for melting. It will be appreciated that although the above discussion has been directed to at least two electrodes, it will be apparent to persons skilled in the art that at least one heating element may also be used with the system.

Commencement of off-gas flow and readiness testing will be performed prior to initiation of the melting process. The melt processing will involve application of electrical power at an increasing rate (start-up ramp) over a period of time and at a given power output value. For example, electrical power may be applied for about 15 hours to a full power level of approximately 500 kW. It is anticipated that processing of waste containing uranium, drums and oil may take a total of two (2) to five (5) days cycle time to complete depending on the type of waste being treated, the power level being employed and the size of the container. Preferably, processing will be performed on a 24-hr/day basis until completed.

FIGS. 4a to 4d illustrate the progressive stages of melting of the material within the container 10.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privledge is claimed are defined as follows:

1. A process for melting materials having hazardous and/or contaminated substances, comprising:
    placing materials including the hazardous and/or contaminated substances into a container that can withstand temperatures of up to 2000 degrees C. without significant degradation of the container wherein the container has a cavity and includes a slip form positioned in the cavity;
    heating the materials in the container to a molten state;
    vitrifying the molten materials without removing molten materials from the container to form a vitrified product in the container that contains at least a portion of the hazardous and/or contaminated substances immobilized therein; and
    discarding the container with the vitrified product therein or removing the vitrified product from the container.

2. The process of claim 1 further including the step of placing sand in the container behind the slip form.

3. The process of claim 2 further including removing the slip form from the container and leaving the sand.

4. The process of claim 2 wherein the slip form is not removed from the container.

5. The process of claim 2 wherein the container has a plurality of walls and an opening is defined between the plurality of walls and the slip form.

6. The process of claim 5 that further includes the step of placing sand in the opening.

7. The process of claim 2 wherein the container has a plurality of walls and a bottom and a first opening is defined between the plurality of walls and the slip form and a second opening is formed between the bottom and the slip form.

8. The process of claim 7 that further includes the step of placing sand in both the first opening and the second opening.

9. A process for melting materials to be treated, the process comprising:
    placing hazardous and/or contaminated and/or waste materials to be treated into a container, wherein the container does not comprise a region formed in the ground;
    covering the material with soil prior to heating;
    heating the hazardous and/or contaminated and/or waste materials to be treated in the container until the materials to be treated melt to create melted hazardous and/or contaminated and/or waste materials; and
    allowing the melted hazardous and/or contaminated and/or waste materials to cool in the container to create a vitrified hazardous and/or contaminated and/or waste material.

* * * * *